United States Patent [19]

Tomozawa et al.

[11] Patent Number: 5,783,251
[45] Date of Patent: Jul. 21, 1998

[54] METHOD FOR SUPPRESSING ELECTRIFICATION AND FOR OBSERVING OR INSPECTING AN ARTICLE

[75] Inventors: Hideki Tomozawa; Yoshihiro Saida; Junya Kato, all of Chiba; Yukie Akakabe, Tokyo; Yoshiaki Ikenoue, Chiba; Reiko Ichikawa, Osaka, all of Japan

[73] Assignee: Showa Denko K.K., Tokyo, Japan

[21] Appl. No.: 863,831

[22] Filed: May 27, 1997

Related U.S. Application Data

[63] Continuation of Ser. No. 351,444, Dec. 21, 1994, abandoned.

[30] Foreign Application Priority Data

May 28, 1993 [JP] Japan .............................. HEI 5-127315
May 25, 1994 [JP] Japan .............................. HEI 6-111410

[51] Int. Cl.$^6$ ........................................................ H05H 1/00
[52] U.S. Cl. ............................ 427/8; 427/58; 427/385.5; 427/496; 427/525; 427/533; 427/551
[58] Field of Search .............................. 425/8, 525, 533, 425/58, 385.5, 496, 551

[56] References Cited

U.S. PATENT DOCUMENTS

5,256,454  10/1993  Murai et al. .............................. 427/498
5,437,893   8/1995  Murai et al. .............................. 427/498
5,589,270  12/1996  Murai et al. .............................. 428/411.1

FOREIGN PATENT DOCUMENTS

A-0164974  12/1985  European Pat. Off.
A-0273643   7/1988  European Pat. Off.
A-0385523   9/1990  European Pat. Off.
A-0399463  11/1990  European Pat. Off.
A-0545417   6/1993  European Pat. Off.
A-4100840   7/1992  Germany.
A-4-32848   2/1992  Japan.

*Primary Examiner*—Bernard Pianalto
*Attorney, Agent, or Firm*—Sughrue, Mion, Zinn, Macpeak & Seas, PLLC

[57] ABSTRACT

An antistatic agent comprising a water-soluble electroconductive polymer comprising at least a repeating unit having a sulfo group-containing isothianaphthenylene structure; a method for suppressing electrification of an article during the production or use of the article by forming an electroconductive film comprising the water-soluble electroconductive polymer on the article; an article of which electrification is suppressed by having an electroconductive film comprising the water-soluble conductive polymer on the article; and a method for observing or inspecting an article with suppressing electrification thereof during irradiation with charged particle beams by forming an electroconductive film comprising the water-soluble electroconductive polymer on the article. The electroconductive film retains the electrification-suppressing effect and removability stably even when subjected to a heat treatment or left to stand for a long period of time. The antistatic agent can be formulated into a film-forming antistatic composition which can be used at any pH value from acidic to basic and which is excellent in storage stability.

8 Claims, 3 Drawing Sheets

METHOD FOR SUPPRESSING ELECTRIFICATION AND FOR OBSERVING OR INSPECTING AN ARTICLE

This is a Continuation of application No. 08/351,444 filed Dec. 21, 1994, abandoned.

TECHNICAL FIELD

This invention relates to an antistatic agent which can be used for suppressing electrification of articles in the fields of electronic elements, components or equipment, electrical parts or equipment, analytical instruments, and the like during the production, use or analysis of the articles; a method for suppressing electrification of these articles by using the antistatic agent or a composition thereof; a method for observation or inspection of these articles by using the antistatic agent; and the electrification-suppressed article by using the antistatic agent or a composition thereof. More particularly, the present invention relates to an antistatic agent or a composition thereof which can be used for suppressing electrification of an article due to accumulation of electrical charges under irradiation with charged particle beams; a method for suppressing electrification of an article by forming an electroconductive film comprising the antistatic agent on the article; a method for observing or inspecting an article under irradiation with charged particle beams while suppressing electrification of the article; and the article per se having an electroconductive film comprising the antistatic agent.

BACKGROUND ART

Electronic elements, electronic components, electronic equipment, electrical parts, electrical equipment, analytical instruments, and the like tend to be electrically charged during production or use (inclusive of analysis). For example, when these articles, particularly insulating ones, are irradiated with charged particle beams, such as electron beams and ion beams, electrical charges are accumulated in the articles to cause electrification. If this occur in the production of semiconductors, IC, LSI, photomasks and the like articles, in which a fine pattern is formed by using charged particle beams, the incident charged particle beams would be influenced by the field of the accumulated charges and deviate from their track. It tends to follow that the positional precision of pattern formation is deteriorated, causing deformation or positional deviation of the pattern and reduction in alignment precision.

If electrification occurs in observation or analysis with an analytical instrument utilizing charged particle beams, such as an electron microscope and an electron tester, the observed image may be distorted or become invisible, or the precision of the tester is deteriorated.

The above-mentioned various problems arising in the production or use of such articles as electronic elements, electronic components, electronic equipment, electrical parts, electrical equipment and analytical instruments, for example, in a step of irradiation with charged particle beams will hereinafter be inclusively referred to as electrification phenomena, and a method for eliminating these phenomena will hereinafter be referred to as a method for suppressing electrification.

There have been proposed a number of methods for suppressing electrification of the aforesaid articles, electronic elements, electronic components, electronic equipment, electrical parts, electrical equipment and analytical instruments, during production or use. For example, it has been proposed to provide a conductive film either on or beneath the surface of an article to be irradiated with charged particle beams. Conductive films heretofore proposed to this effect include an aluminum deposit film (as described in JP-A-63-226926, the term "JP-A" as used herein means "an unexamined published Japanese patent application"), a film of chloromethylated polystyrene (as described in JP-A-63-129622), a film of ammonium polystyrenesulfonate (as described in JP-A-64-37015), and a film of an ion-conducting water-soluble material (as described in JP-A-1-132122).

However, deposition of aluminum involves a complicated step of vacuum evaporation and, when applied to such an article as a semiconductor element, causes contamination of the article with the metallic element. Since chloromethylated polystyrene develops conductivity only in the irradiated area, it is necessary to provide a conductive film (conducting path) for ground connection on at least part of the article to be irradiated. Since ammonium polystyrenesulfonate and the material disclosed in JP-A-1-132122 use ions as a carrier, there is a limit in achieving suppression of electrification, following up a high-speed electron beam lithographic system (as described in *KOGYO ZAIRYO* (Industrial Materials), Vol. 40, No. 5, p. 49 (1992)).

In recent years, there have been proposed a method comprising forming a conductive film of an electroconducting water-soluble polymer having a sulfo group in the side chain thereof and π-electron conjugated double bonds in the main chain thereof, such as polythiophene derivatives, polyfuran derivatives, polypyrrole derivatives, polyphenylenevinylene derivatives, and polyaniline derivatives (as described in JP-A-4-32848), and a method comprising forming a conductive film of an ammonium salt of a polyaniline derivative having a sulfo group in the side chain thereof (as described in JP-A-4-349614).

Since these polymers are water-soluble, they permit application in the form of an aqueous solution, making it easy to form an electroconductive film and to remove the film. Besides, achieving electron conduction along the main chain thereof, they exhibit sufficient conductivity even with a small thickness to produce a considerable electrification-suppressing effect. In particular, the compound according to JP-A-4-349614 is characterized by providing an aqueous solution which is not strongly acidic and therefore gives no adverse influences to a resist.

Nevertheless, the compounds of JP-A-4-32848 turned out to have the following disadvantages. The aqueous solution thereof reduces its conductivity upon being neutralized as is revealed in Comparative Example 1 hereinafter given. In some cases, they reduce their solubility on being subjected to a heat treatment at 100° C. or higher as referred to, e.g., in Examples of JP-A-3-221520 and, therefore, their usage is limited in some applications. Further, the conductive film formed on an article largely varies its conductivity with time and fails to maintain the conductivity stably for an extended period of time under general conditions of use. That is, these compounds are limited in conditions of coating and storage. For the details, reference can be made, e.g., to the Extended Abstracts at the 52nd autumn meeting of the Japan Society of Applied Physics, in 1991, No. 2, p. 598, 12p-ZE-10.

The polyaniline derivatives of JP-A-4-349614 involve the following problems. The polyaniline derivatives are prepared by sulfonation of insoluble and infusible polyaniline with fuming sulfuric acid. Therefore, the degree of sulfonation is difficult to control, resulting in difficulty in obtaining products with good reproducibility. The conductive film of the polyaniline derivative has poor removability and cannot be removed completely even by washing with water as proved in Comparative Example 2 hereinafter described. The preparation of polyaniline, the starting material of the polyaniline derivatives of JP-A-4-349614, is reported to be accompanied with by-production of benzidine (J. Electroanal. Chem., vol. 339(1-2), p. 423 (1992)/CA118 (4); 29104c). Gel-permeation chromatography (GPC) has lent confirmation to the presence of by-produced benzidine (Polym. Mater. Sci., Vol. 61, p. 911 (1989)/CA112(14); 119752t). Further, since a compound having a polyaniline skeleton has a high oxidation-reduction potential and a large band gap, the conductivity of the conductive film is reduced when allowed to stand in the air, and the compound, when preserved in the form of a solution for a long time, fails to provide a conductive film having a sufficient electrification-suppressing effect as demonstrated in Comparative Example 2.

As discussed above, known techniques for suppressing electrification of such articles as electronic elements, electronic components, electronic equipment, electrical parts, electrical equipment, and analytical instruments have various problems waiting for solution. It has therefore been demanded to establish a method for suppressing electrification of these articles comprising formation of a conductive film, in which method conditions for film formation or conditions of use are less limited, the conductive film stably maintains removability, conductivity or electrification-suppressing effect even when subjected to a heat treatment or allowed to stand for a prolonged period of time, and large freedom in process design is allowed. It has also been demanded to develop an antistatic agent and a composition thereof having excellent storage stability for forming the above-mentioned conductive film.

DISCLOSURE OF INVENTION

A first object of the present invention is to provide an antistatic agent which can be used for suppressing electrification of an article during production or use of the article.

A second object of the present invention is to provide a method for substantially suppressing electrification of an article using the above-mentioned antistatic agent.

For example, the first and second objects are to provide an excellent antistatic agent which can be used for suppressing electrification of an article during the production or use of the article including a step of irradiation of charged particle beams and to provide a method for suppressing electrification using the same, and more specifically, to provide an excellent antistatic agent which can be used for forming an electron-conducting electroconductive film for suppression of electrification of an article in a step of irradiating charged particle beams onto the article, which is effective at any pH from acidic to basic, and which is excellent in storage stability and to provide a method for suppressing electrification of an article during irradiation with charged particle beams in which an electroconductive film can easily be formed and removed, and an excellent electrification-suppressing effect can be obtained in a stable manner.

A third object of the present invention is to provide an article which has an electroconductive film comprising the above-mentioned antistatic agent and of which electrification is thereby substantially suppressed during the production or use thereof.

The third object, for example, is to provide an article having an electroconductive film comprising the aforesaid antistatic agent and of which electrification is thereby substantially suppressed during irradiation with charged particle beams, and more particularly to provide an article having an electroconductive film exerting an electrification-suppressing effect during irradiation with charged particle beams, the electrification-suppressing effect stably lasting even when the film is subjected to a heat treatment or stored for a long period of time, and the film maintaining removability and its electrification-suppressing effect even after a heat treatment or long-term storage.

A fourth object of the present invention is to provide a method for observing or inspecting an article while substantially suppressing electrification of the article, which method comprises forming an electroconductive film comprising the above-mentioned antistatic agent on the article; irradiating the article with charged particle beams, such as electron or ion beams; and detecting the reflected charged particle beams or secondary radiation.

The first object of the present invention is accomplished by an antistatic agent for suppressing electrification of an article during the production or use of the article, for example, during irradiation with charged particle beams, such as electron or ion beams, the antistatic agent comprising a water-soluble electroconductive polymer comprising at least one repeating unit selected from a structural unit represented by formula (Ia) and a structural unit represented by formula (IIa), and having π-electron conjugated double bonds in the main chain of the polymer:

wherein $R_1$, $R_2$, $R_3$, and $R_4$ each independently represents a hydrogen atom or a monovalent group selected from the group consisting of a linear or branched, saturated or unsaturated alkyl, alkoxy or alkyl ester group each having from 1 to 20 carbon atoms, a halogen atom, $SO_3^-M$ in which M represents $H^+$ for $R^1$ or $R^2$, a nitro group, a cyano group, a primary, secondary or tertiary amino group, a trihalomethyl group, and a substituted or unsubstituted phenyl group; M represents a quaternary ammonium cation represented by $NR_5R_6R_7R_8^+$, a quaternary cation of a Group Vb element represented by $PR_5R_6R_7R_8^+$ or $AsR_5R_6R_7R_8^+$, or an alkali metal ion, such as $Na^+$, $Li^+$ or $K^+$, wherein $R_5$, $R_6$, $R_7$, and $R_8$ each independently represents a hydrogen atom, a linear or branched, substituted or unsubstituted alkyl group having from 1 to 30 carbon atoms or a substituted or unsubstituted aryl group having from 6 to 30 carbon atoms, in which the alkyl or aryl group may contain a group containing an element other than carbon and hydrogen, such as an alkoxy group, a hydroxyl group, an oxyalkylene group, a thioalkylene group, an azo group, an azobenzene group, or a p-diphenyleneoxy group; $R_1$ and $R_2$, $R_3$ and $R_4$, or two or more of $R_5$, $R_6$, $R_7$, and $R_8$ in M may be connected together at any optional position to form at least one divalent chain which forms, together with two carbon atoms of the substituted ring or a substituted atom of the Group Vb element, at least one saturated or unsaturated ring structure; the alkyl group represented by $R_1$, $R_2$, $R_3$, $R_4$, $R_5$, $R_6$, $R_7$ or $R_8$ or the alkoxy or alkyl ester group represented by $R_1$, $R_2$, $R_3$ or $R_4$ may contain in the chain thereof at least one bond selected from the group consisting of a carbonyl group, an ether group, an ester group, an amido group, a sulfide group, a sulfinyl group, a sulfonyl group, and an imino group.

The first object of the present invention is also accomplished by an antistatic agent for suppressing electrification of an article during the production or use of the article, for example, during irradiation with charged particle beams, such as electron or ion beams, the antistatic agent comprising a water-soluble electroconductive polymer comprising at least one repeating unit selected from a structural unit represented by formula (Ib) and a structural unit represented by formula (IIb), and having π-electron conjugated double bonds in the main chain of the polymer:

wherein $R_1$, $R_2$, $R_3$, and $R_4$ each independently represents a hydrogen atom or a monovalent group selected from the group consisting of a linear or branched, saturated or unsaturated alkyl or alkoxy group each having from 1 to 20 carbon atoms, a halogen atom, a nitro group, a cyano group, a primary, secondary or tertiary amino group, a trihalomethyl group, and a substituted or unsubstituted phenyl group; M represents a quaternary ammonium cation represented by $NR_5R_6R_7R_8^+$, a quaternary cation of a Group Vb element represented by $PR_5R_6R_7R_8^+$ or $AsR_5R_6R_7R_8^+$, or an alkali metal ion such as $Na^+$, $Li^+$ or $K^+$, wherein $R_5$, $R_6$, $R_7$, and $R_8$ each independently represents a hydrogen atom, a linear or branched alkyl group having from 1 to 6 carbon atoms or a substituted or unsubstituted aryl group; $R_1$ and $R_2$, $R_3$ and $R_4$, or two or more of $R_5$, $R_6$, $R_7$, and $R_8$ in M may be connected together at any optional position to form at least one divalent chain which forms, together with two carbon atoms of the substituted ring or a substituted atom of the Group Vb element, at least one saturated or unsaturated hydrocarbon ring or heterocyclic structure; the alkyl group represented by $R_1$, $R_2$, $R_3$, $R_4$, $R_5$, $R_6$, $R_7$ or $R_8$ or the alkoxy group represented by $R_1$, $R_2$, $R_3$ or $R_4$ may contain in the chain thereof at least one bond selected from the group consisting of a carbonyl group, an ether group, and an amido group.

The first object is also accomplished by an antistatic composition for forming an electroconductive film on an article to substantially suppress electrification of the article during the production or use of the article, for example, in a step including irradiating charged particle beams onto the article or a step including irradiating charged particle beams onto the article and detecting the reflected charged particle beams or secondary radiation, comprising (1a) a water-soluble electroconductive polymer comprising at least one repeating unit selected from a structural unit represented by formula (Ia) and a structural unit represented by formula (IIa) and having π-electron conjugated double bonds in the main chain of the polymer and (2) water.

The first object is also accomplished by an antistatic composition for forming an electroconductive film on an article to substantially suppress electrification of the article during the production or use of the article, for example, in a step including irradiating charged particle beams onto the article or a step including irradiating charged particle beams onto the article and detecting the reflected charged particle beams or secondary radiation, comprising (1b) a water-soluble electroconductive polymer comprising at least one repeating unit selected from a structural unit represented by formula (Ib) and a structural unit represented by formula (IIb) and having π-electron conjugated double bonds in the main chain of the polymer and (2) water.

In preferred embodiments of the above-mentioned antistatic agents or compositions thereof, the water-soluble electroconductive polymer has a molecular weight of 2,000 or more.

The above-mentioned antistatic agents and compositions thereof according to the present invention can be used for forming an electroconductive film for suppressing electrification of an article in a step of irradiating charged particle beams onto the article, and is effective at any pH from acidic to basic and excellent in storage stability.

The second object of the present invention is accomplished by a method for suppressing electrification of an article during the production or use thereof, for example during irradiation with charged particle beams, the method comprising forming an electroconductive film on the article, the electroconductive film comprising a water-soluble electroconductive polymer comprising at least one repeating unit selected from structural units represented by formula (Ia) and (IIa) and having π-electron conjugated double bonds in the main chain of the polymer.

The second object of the present invention is also accomplished by a method for suppressing electrification of an article during the production or use thereof, for example during irradiation with charged particle beams, the method comprising forming an electroconductive film on the article, the electroconductive film comprising a water-soluble electroconductive polymer comprising at least one repeating unit selected from structural units represented by formula (Ib) and (IIb) and having π-electron conjugated double bonds in the main chain of the polymer.

The second object of the present invention is also accomplished by a method for suppressing electrification of an article comprising forming an electroconductive film for suppression of electrification in a step of irradiating charged particle beams onto the article, the electroconductive film comprising a water-soluble electroconductive polymer comprising at least one repeating unit selected from structural units represented by formula (Ia) and (IIa) and having π-electron conjugated double bonds in the main chain thereof or a water-soluble electroconductive polymer having at least one repeating unit selected from structural units represented by formula (Ib) and (IIb) and having π-electron conjugated double bonds in the main chain thereof, by using an antistatic agent comprising the water-soluble electroconductive polymer or an antistatic composition comprising the water-soluble electroconductive polymer and water.

According to this method, the antistatic agent or the composition thereof can be used at any pH from acidic to basic; formation of an electroconductive film can easily be carried out, for example, by coating an article with the antistatic composition; the electroconductive film thus formed can easily be removed; and a considerable electrification-suppressing effect can be obtained in a stable manner and for a prolonged period of time.

In preferred embodiments of the above-mentioned method, the water-soluble electroconductive polymer has a molecular weight of 2,000 or more.

The third object of the present invention is accomplished by an article having an electroconductive film comprising the aforesaid antistatic agent and thereby electrification thereof is substantially suppressed during the production or use thereof, for example, in a step including irradiating charged particle beams. The article maintains the electrification-suppressing effect even after being subjected to a heat treatment or stored for a long period of time and exhibits excellent removability of the electroconductive film even after being subjected to a heat treatment or stored for a long period of time.

The fourth object of the present invention is accomplished by a method for observing or inspecting an article with substantially suppressing electrification thereof, the method comprising forming an electroconductive film on the article, the electroconductive film comprising the aforesaid antistatic agent; and then irradiating charged particle beams onto the article to detect the reflected charged particle beams or secondary radiation.

BEST MODE FOR PRACTICING INVENTION

The water-soluble electroconductive polymer having π-electron conjugated double bonds in the main chain thereof comprises at least one repeating unit selected from structural units (Ia) and (IIa) or at least one repeating unit selected from structural units (Ib) and (IIb). The polymer includes a homopolymer comprising one of the repeating units (Ia) and (IIa), or one of the repeating units (Ib) and (IIb), a copolymer comprising (i) at least 5 mol % (0.05 in terms of a molar fraction), based on the total repeating units, of at least one repeating unit selected from the structural units (Ia) and (IIa), or from the structural units (Ib) and (IIb) and (ii) another repeating unit selected from the structural units (Ia) and (IIa) or from the structural units (Ib) and (IIb), or another structural unit, and a copolymer comprising (i) both of the repeating units (Ia) and (IIa), or both of the repeating units (IIa) and (IIb) and (ii) another structural unit.

The molar fraction of at least one repeating unit selected from the structural units (Ia) and (IIa) or from the structural unit (Ib) and (IIb) in the copolymer should be 0.05 or more as described above, and preferably 0.10 or more, and more preferably 0.25 or more. Of these copolymers particularly preferred are a homopolymer and a copolymer each comprising one repeating unit selected from the structural units (Ia) and (IIa) or from the structural units (Ib) and (IIb) having a molar fraction of the repeating unit of 0.50 or more, and a copolymer comprising both of the repeating units (Ia) and (IIa) or units (Ib) and (IIb) having a molar fraction for the units of 0.50 or more in total.

In formulae (Ia) and (IIa), $R_1$, $R_2$, $R_3$, and $R_4$ each independently represents a hydrogen atom or a monovalent group selected from the group consisting of a linear or branched, saturated or unsaturated alkyl, alkoxy or alkyl ester group each having from 1 to 20 carbon atoms, a halogen atom, $SO_3^-M$ in which M represents $H^+$ for $R^1$ or $R^2$, a nitro group, a cyano group, a primary, secondary or tertiary amino group (inclusive of aliphatic or aromatic amino groups), a trihalomethyl group (e.g., a chloromethyl group), and a substituted or unsubstituted phenyl group.

Specifically useful examples of $R_1$, $R_2$, $R_3$, and $R_4$ in formulae (Ia) and (IIa) include a hydrogen atom, an alkyl group, an alkoxy group, an alkyl ester group, and a substituted or unsubstituted phenyl group. Specific examples of the alkyl group include methyl, ethyl, propyl, allyl, isopropyl, butyl, 1-butenyl, pentyl, hexyl, heptyl, octyl, nonyl, decyl, undecyl, dodecyl, tetradecyl, hexadecyl, ethoxyethyl, methoxyethyl, methoxyethoxyethyl, acetonyl, and phenacyl groups. Specific examples of the alkoxy group include methoxy, ethoxy, propoxy, isopropoxy, butoxy, pentyloxy, hexyloxy, octyloxy, dodecyloxy, methoxyethoxy, and methoxyethoxyethoxy groups. Specific examples of the alkyl ester group include alkoxycarbonyl groups, such as methoxycarbonyl, ethoxycarbonyl, and butoxycarbonyl groups, and acyloxy groups, such as acetoxy and butyroyloxy groups. Specific examples of the substituted phenyl group include fluorophenyl, chlorophenyl, bromophenyl, methylphenyl, and methoxyphenyl groups. The alkyl, alkoxy or alkyl ester group represented by $R_1$, $R_2$, $R_3$ or $R_4$ may contain in the chain thereof at least one bond selected from the group consisting of a carbonyl group, an ether group, an ester group, an amido group, a sulfide group, a sulfinyl group, a sulfonyl group, and an imino group.

In formulae (Ib) and (IIb), $R_1$, $R_2$, $R_3$, and $R_4$ each independently represents a hydrogen atom or a monovalent group selected from the group consisting of a linear or branched, saturated or unsaturated alkyl or alkoxy group each having from 1 to 20 carbon atoms, a halogen atom, a nitro group, a cyano group, a primary, secondary or tertiary amino group (inclusive of aliphatic or aromatic amino groups), a trihalomethyl group, and a substituted phenyl or unsubstituted group.

Specifically useful examples of $R_1$, $R_2$, $R_3$, and $R_4$ in formulae (Ib) and (IIb) include a hydrogen atom, an alkyl group, an alkoxy group, or a substituted or unsubstituted phenyl group. Specific examples of the alkyl group include methyl, ethyl, propyl, allyl, isopropyl, butyl, 1-butenyl, pentyl, hexyl, heptyl, octyl, nonyl, decyl, undecyl, dodecyl, tetradecyl, hexadecyl, ethoxyethyl, methoxyethyl, methoxyethoxyethyl, acetonyl, and phenacyl groups. Specific examples of the alkoxy group include methoxy, ethoxy, propoxy, isopropoxy, butoxy, pentyloxy, hexyloxy, octyloxy, dodecyloxy, methoxyethoxy, and methoxyethoxyethoxy groups. Specific examples of the substituted phenyl group include fluorophenyl, chlorophenyl, bromophenyl, methylphenyl, and methoxyphenyl groups. The alkyl or alkoxy group represented by $R_1$, $R_2$, $R_3$ or $R_4$ may contain in the chain thereof at least one bond selected from the group consisting of a carbonyl group, an ether group, and an amido group.

Of $R_1$, $R_2$, $R_3$, and $R_4$ as represented above in formulae (Ia), (IIa), (Ib), and (IIb), $R_1$, $R_2$, $R_3$ and $R_4$ each independently more preferably represents a hydrogen atom, a linear or branched alkyl or alkoxy group each having from 1 to 20 carbon atoms, and most preferably a hydrogen atom or a linear or branched alkoxy group each having from 1 to 20 carbon atoms.

$R_1$ and $R_2$ in formula (Ia) or (Ib) or $R_3$ and $R_4$ in formula (IIa) or (IIb) may be connected together at any optical position to form at least one divalent chain which forms, together with two carbon atoms of the substituted ring, at least one saturated or unsaturated ring structure, for example, a hydrocarbon ring. Examples of the divalent chain formed by $R_1$ and $R_2$ or $R_3$ and $R_4$ include a butylene group, a pentylene group, a hexylene group, a butadienylene group, a substituted butadienylene group, and a methylenedioxy group.

In formula (IIa), M represents a quaternary ammonium cation represented by $NR_5R_6R_7R_8^+$, a quaternary cation of a Group Vb element represented by $PR_5R_6R_7R_8^+$ or $AsR_5R_6R_7R_8^+$, or an alkali metal ion, such as $Na^+$, $Li^+$ or $K^+$, wherein $R_5$, $R_6$, $R_7$, and $R_8$ each independently represents a hydrogen atom, a linear or branched, substituted or unsubstituted alkyl group having from 1 to 30 carbon atoms, or a substituted or unsubstituted aryl group having from 6 to 30 carbon atoms. The alkyl or aryl group represented by $R_5$, $R_6$, $R_7$ or $R_8$ may contain a group containing an element other than carbon and hydrogen, such as an alkoxy group, a hydroxyl group, an oxyalkylene group, a thioalkylene group, an azo group, an azobenzene group, or a p-diphenyleneoxy group.

The quaternary ammonium cation as represented by $NR_5R_6R_7R_8^+$ includes unsubstituted or alkyl- or aryl-substituted cations, such as $NH_4^+$, $NH(CH_3)_3^+$, $NH(C_6H_5)_3^+$, $N(CH_3)_2(CH_2OH)(CH_2-Z)^+$, wherein Z represents a substituent of a formula weight of not more than 600, such as a phenoxy group, a p-diphenyleneoxy group, a p-alkoxydiphenyleneoxy group or a p-alkoxyphenylazophenoxy group. The quaternary cation of the Group Vb element as represented by $PR_5R_6R_7R_8^+$ or $AsR_5R_6R_7R_8^+$ includes unsubstituted or alkyl- or aryl-substituted cations, such as $PH_4^+$, $PH(CH_3)_3^+$, $PH(C_6H_5)_3^+$, $AsH_4^+$, $AsH(CH_3)_3^+$, and $AsH(C_6H_5)_3^+$. A general ion-exchange resin may be used for conversion to a specific cation.

Two or more of $R_5$, $R_6$, $R_7$, and $R_8$ may be connected together at an optional position to form at least one divalent chain which forms, together with a substituted atom of the Group Vb element, at least one saturated or unsaturated heterocyclic structure. The alkyl group represented by $R_5$, $R_6$, $R_7$ or $R_8$ may contain at least one bond such as carbonyl, ether, ester, amido, sulfide, sulfinyl, sulfonyl or imino group in the alkyl chain thereof.

In formula (IIb), M represents a quaternary ammonium cation represented by $NR_5R_6R_7R_8^+$, a quaternary cation of a Group Vb element represented by $PR_5R_6R_7R_8^+$ or $AsR_5R_6R_7R_8^+$, or an alkali metal ion, such as $Na^+$, $Li^+$ or $K^+$, wherein $R_5$, $R_6$, $R_7$, and $R_8$ each independently represents a hydrogen atom, a linear or branched alkyl group having from 1 to 6 carbon atoms, or a substituted or unsubstituted aryl group.

The quaternary ammonium cation as represented by $NR_5R_6R_7R_8^+$ includes unsubstituted or alkyl- or aryl-substituted cations, such as $NH_4^+$, $NH(CH_3)_3^+$, $NH(C_6H_5)_3^+$, $N(CH_3)_2(CH_2OH)(CH_2-Z)^+$, wherein Z represents an arbitrary substituent. The quaternary cation of a Group Vb element as represented by $PR_5R_6R_7R_8^+$ or $AsR_5R_6R_7R_8^+$ includes unsubstituted or alkyl- or aryl-substituted cations, such as $PH_4^+$, $PH(CH_3)_3^+$, $PH(C_6H_5)_3^+$, $AsH_4^+$, $AsH(CH_3)_3^+$, and $AsH(C_6H_5)_3^+$. A general ion-exchange resin may be used for conversion to a specific cation.

Two or more of $R_5$, $R_6$, $R_7$, and $R_8$ may be connected together at an optional position to form a divalent chain which forms, together with a substituted atom of the Group Vb element, a saturated or unsaturated heterocyclic structure. The alkyl group as $R_5$, $R_6$, $R_7$ or $R_8$ may contain at least one bond such as carbonyl group, ether group or amido group in the alkyl chain thereof.

Examples of the divalent chain formed by two or more of $R_5$, $R_6$, $R_7$, and $R_8$ include a butylene group, a pentylene group, a hexylene group, a butadienylene group, a substituted butadienylene group, and a methylenedioxy group.

In formula (IIa) or (IIb), M preferably represents a quaternary ammonium cation ($NR_5R_6R_7R_8^+$) or an alkali metal ion (e.g., $Na^+$, $Li^+$ or $K^+$), with a quaternary ammonium cation being particularly preferred.

In formula (IIa), $R_5$, $R_6$, $R_7$, and $R_8$ each independently preferably represents a hydrogen atom or a linear or branched alkyl group having from 1 to 30 carbon atoms. In formula (IIb), $R_5$, $R_6$, $R_7$, and $R_8$ each independently preferably represents a hydrogen atom or a linear or branched, substituted or unsubstituted alkyl group having from 1 to 6 carbon atoms.

Repeating units other than the structural units (Ia), (IIa), (Ib) and (IIb) which constitute the water-soluble electroconductive copolymers of the present invention include vinylene, thienylene, pyrrolylene, phenylene, iminophenylene, isothianaphthenylene, furylene, carbazolylene, and substituted derivatives of these units. Particularly preferred of them are an isothianaphthenylene unit and its substituted derivatives.

The content of these units other than the units (Ia) and (IIa) or the units (Ib) and (IIb) in the copolymer should be less than 95 mol % (lower than 0.95 in terms of a molar fraction). If it exceeds 95 mol %, the copolymer tends to lose water-solubility, though depending on the copolymer composition. From the standpoint of water-solubility, molar fraction of these units in the copolymer is preferably lower than 0.90, more preferably lower than 0.75, and most preferably lower than 0.50.

The water-soluble electroconductive polymers which can be used in the present invention are not particularly limited in molecular weight as long as they produce a sufficient electrification-suppressing effect for meeting the objects of the present invention. A preferred molecular weight is 2,000 or more. Where an electroconductive film is removed from an article after serving for suppression of electrification, the polymer should have such a molecular weight that assures satisfactory removal from the article, for example, about 1,000,000 or less. Low-molecular weight polymers having a molecular weight of less than 2000 are apt to have poor film-forming properties or exhibit poor conductivity. High-molecular weight polymers whose molecular weight exceeds 1,000,000 are liable to have poor solubility or removability.

The water-soluble electroconductive polymers comprising at least one repeating unit selected from the units (Ia) and (IIa) or at least one repeating unit selected from the units (Ib) and (IIb) and having π-electron conjugated double bonds in the main chain thereof serve by themselves as an antistatic agent according to the present invention.

The above-described water-soluble electroconductive polymer according to the present invention can be used in combination with other components, such as water and/or at least one surface active agent to provide an antistatic composition. Examples of the surface active agents include anionic surface active agents, cationic surface active agents, nonionic surface active agents, silicone-containing surface active agents, and fluorine-containing surface active agents. Examples of the ionic surface active agents include alkylsulfates, such as laurylsulfates, dioctylsuccinsulfates, myristylsulfates, and stearylsulfates; alkyl- or arylsulfonates, such as laurylsulfonates, mystylsulfonates, allylbenzenesulfonates, and stearylsulfonates; salts thereof; N-ethylalkaneamidoammonium salts; and alkyltrimethylammonium salts. Examples of the nonionic surface active agents include polyoxyethylene alkylphenol ethers, polyoxyethylene alkyl ethers, polyoxyethylene fatty acid esters, fatty acid polyhydric alcohol esters, and fatty acid sucrose esters. Examples of the silicone-containing type surface active agents include anionic silicone-containing surface active agents, such as ω-triethylsilyl aliphatic carboxylic acids or salts thereof, and cationic or nonionic silicone-containing surface active agents. Examples of the fluorine-containing surface active agents include the above-enumerated general hydrocarbon type surface active agents with the hydrogen atoms of the alkyl group thereof being replaced with fluorine atoms and include, for example, perfluoroalkyl-substituted surface active agents, such as 3-(perfluorooctylsulfoamino)propyltrimethylammonium iodide and perfluorocaprylic acid or a salt thereof.

The surface active agent may be used in an amount in a weight ratio of from 0.001 to 20, preferably from 0.005 to 5, and more preferably from 0.01 to 1, based on the weight of the water-soluble electroconductive polymer. An antistatic agent containing the surface active agent in a weight ratio of less than 0.001 sometimes fails to form a uniform coating film on an article, as depends on the type of the polymer and the article. If the ionic surface active agent is present in a weight ratio exceeding 20, the conductivity of the resulting coating film would be governed by ionic conduction having slower response.

As stated above, the antistatic agent of the present invention may contain water to provide an aqueous antistatic composition. The antistatic composition containing water may be a system consisting of solid components comprising the water-soluble electroconductive polymer as an essential component and a major proportion of water, such as an aqueous solution. The total solids content in the antistatic composition is preferably not less than 0.001% and less than 50% by weight, more preferably from 0.01 to 20% by weight, and most preferably from 0.1 to 5% by weight. Antistatic compositions having a total solids content of 50% by weight or more tend to become non-uniform. The antistatic composition may be a system consisting of solid components and a minor proportion of water, such as a film of a substantially solid system or a wet solid system as prepared, or for use, or as applied onto an article. The water content by weight in the solid or wet solid system is preferably not more than 100, more preferably not more than 50, and most preferably not more than 25, per 100 by weight of the dried solid content. If it exceeds 100, the system is not easily handled as a solid or a wet solid.

The method according to the present invention is to suppress electrification of such an article as an electronic element, an electronic component, electronic equipment, an electrical part, electrical equipment, an analytical instrument or a part thereof during the production or use thereof. Suppression of electrification can be achieved by forming an electroconductive film comprising the aforesaid water-soluble electroconductive polymer using the aforesaid antistatic agent or antistatic composition on an article. The formation of the electroconductive film can be carried out, for example, before an article to be irradiated with charged particle beams is shaped or after it is shaped.

In the method for observing or inspecting an article with substantially suppressing electrification thereof, the method comprises applying the aforesaid antistatic agent or antistatic composition on an article to form an electroconductive film comprising the aforesaid water-soluble electroconductive polymer, irradiating charged particle beams onto the article, and detecting the reflected charge of particle beams such as electron or ion beams, or secondary radiation.

Where the production or use of an article includes a step of irradiating charged particle beams onto the article as illustrated above, if desired, the irradiation step may be followed by a treatment of the electroconductive film, such as drying and/or a heat treatment. If desired, the electroconductive film after serving for suppression of electrification may be heat-treated and/or removed by washing with water.

The water-soluble electroconductive polymer-containing antistatic composition in the form of an aqueous solution can have its pH value varied from acidic to basic by changing the content of the structural unit (Ia) and (IIa), or (Ib) and (IIb). That is, acidity increases as the content of the unit (Ia) or (Ib) increases, whereas basicity increases as the content of the unit (IIa) or (IIb) increases. The pH of the aqueous solution may also be adjusted by addition of an acid or an alkali.

The antistatic composition in the form of an aqueous solution undergoes no change, such as gelation or association, even when preserved for a long period of time, and the solution after long-term storage is still capable of providing an electroconductive film showing conductivity and an electrification-suppressing effect equal to those attained by an electroconductive film prepared from an antistatic composition immediately after preparation.

An electroconductive film comprising the water-soluble electroconductive polymer can be formed on an article in any manner according to the article or the end use of the article. For example, an article can be spin-coated with an aqueous solution of the antistatic agent or the antistatic composition of the present invention, or dip-coated in the aqueous solution, or spray-coated with the antistatic agent (or composition) in the form of a solid or an aqueous solution either as such or after appropriately treated by dissolving, grinding, and the like. For example, coating of an article with the aqueous solution of the antistatic agent or the antistatic composition is easy to carry out. Film-forming properties, for example, coating properties, of the aqueous solution of the antistatic agent or the antistatic composition may be improved by using at least one of the aforesaid surface active agents in combination. To the same effect, the antistatic composition according to the present invention comprising a surface active agent and water in addition to the essential water-soluble electroconductive polymer is effectively used.

The thus formed electroconductive film comprises at least one of the structural units (Ia) and (IIa) or at least one of the structural units (Ib) and (IIb). Since the sulfo group in the side chain acts as a dopant offering a carrier to the π-electron conjugated system in the main chain, the film exerts conductivity by itself with no aid of external additives (externally supplied dopants). Such a mechanism of action is called self-doping mechanism. Further, since the film contains an isothianaphthenylene skeleton as a repeating unit as shown in formulae (Ia), (IIa), (Ib) and (IIb), the oxidation potential of the π-electron conjugated system is low, and the band gap is narrow. As a result, the film exhibits conductivity in an extremely stable manner. Additionally, the film can satisfactorily be removed with water even after it is subjected to a heat treatment or preserved for an extended period of time.

In a preferred embodiment of the present invention, the electroconductive film comprises the structural unit (IIa) or (IIb) in which M is a quaternary ammonium cation ($NR_5R_6R_7R_8^+$), and the conductivity of the film is further improved by subjecting the film to a heat treatment to release an amine, such as ammonia, from the ammonium salt thereby changing the content of the unit (IIa) or (IIb).

In another preferred embodiment of the present invention, the conductivity of the electroconductive film can further be improved by doping with an externally supplied dopant. The doping can be carried out chemically and/or electrochemically. Since the water-soluble electroconductive polymer comprises an isothianaphthenylene skeleton as a repeating unit constituting the main chain as previously described, the π-electron conjugated system has a low oxidation potential and a narrow band gap. Therefore, the doping can be carried out with extreme ease, and the thus attained conductivity can be stably maintained. For instance, when an electroconductive film is allowed to stand in the air, the film is doped with oxygen in the air to further stabilize the conductivity. This favorable phenomenon is characteristically observed with an isothianaphthenylene skeleton.

The conductivity of the electroconductive film provided on an article cannot be generally specified, for it depends on the kind of the article, the process for producing the article, and the manner of use of the article. In general, the electroconductive film having a surface resistivity of less than $1\times10^{13}\Omega$ per square can be used, and preferably less than $1\times10^{10}\Omega$ per square. Where the production or use of the article includes a step of irradiating charged particle beams, the electroconductive film generally having a surface resistivity of less than $2\times10^8\Omega$ per square can be used, preferably less than $1\times10^8\Omega$ per square, and most preferably less than $5\times10^7\Omega$ per square.

The water-soluble electroconductive polymer-containing antistatic agent or an aqueous solution thereof or the antistatic composition according to the present invention can be adjusted to an optimum pH value in conformity with the properties of an article on which an electroconductive film is to be formed, thereby providing an antistatic composition fit to the end use and a method using the same. Taking for instance an article comprising a substrate (e.g., a semiconductor substrate comprising silicon or gallium/arsenic, a glass substrate, or a semiconductor or glass substrate having thereon a metal deposit layer, e.g., chromium) having thereon a chemically amplified positive electron beam-sensitive resist layer comprising a dissolution inhibitor, an acid generator, and partially t-butoxycarbonylated polyvinyl phenol, it is preferable to form an electroconductive film on the article (i.e., either on or beneath the surface resist layer) by using an acidic antistatic agent aqueous solution having a low pH. In this case, formation of a sparingly solubilizable layer on the surface of the resist layer can be inhibited, or a sparingly solubilizable layer, if formed, can be removed. These effects have been confirmed through experimentation using a substrate having the above-mentioned resist layer by reference to the Extended Abstracts at the 40th spring meeting of the Japan Society of Applied Physics and Related Societies in 1993, No. 2, p. 554, 30p-K-4.

Taking for another instance an article having a chemically amplified negative electron beam-sensitive resist layer (such as "SAL 601", a product of Siplay Company Inc.) comprising a novolak, a photosensitive compound, and an acid generator having a bromomethyl group, it is preferable to form an electroconductive film thereon by using a neutral to alkaline aqueous solution of the antistatic agent or the antistatic composition of the present invention. In this case, the resist layer can be prevented from hardening over the entire surface thereof without requiring any study on alterations of the process. This effect has been demonstrated through experimentation by reference to the Extended Abstracts at the 53rd autumn meeting of the Japan Society of Applied Physics in 1992, No. 2, p. 512, 18p-ZC-4, with the result that no sulfur was detected after washing with water irrespective of the pre-baking temperature of the resist. Further, because the film-forming solution uses water as a solvent, it can be applied directly to an article whose surface is made of an organic solvent-soluble material (such as a resist) without corroding the surface.

The electroconductive film of the present invention retains its water-solubility even after exposed to high energy electron beams or after subjected to a heat treatment, e.g., at about 120° C. Retention of water-solubility after heating provides an advantage in processes where the film is formed, e.g., on a chemically amplified resist layer which needs baking after exposure. In this case, the film can be washed away with water after the baking. Further, the electroconductive film formed on an article retains its electrification-suppressing effect even when allowed to stand in the air for a long period of time, thereby making it possible to store the article with the film on for an extended period of time. Furthermore, the electroconductive film has satisfactory removability even after long-term storage.

Thus, the present invention provides a method for suppressing electrification utilizing an electroconductive film, in which conditions of film formation are less limited, the electroconductive film stably maintains removability and the electrification-suppressing effect even when subjected to a heat treatment or allowed to stand for a prolonged period of time, and large freedom in process design is allowed.

The present invention further provides an antistatic agent or an antistatic composition for formation of the above-described electroconductive film, having excellent storage stability. The present invention furthermore provides an article having the above-described electroconductive film and thereby electrification thereof is suppressed. The present invention furthermost provides a method for observing or inspecting an article comprising forming the above-described electroconductive film on the article to be analyzed so as to suppress electrification of the article.

More specifically, the present invention provides a method for suppressing electrification in a step of irradiation with charged particle beams, in which formation of an antistatic electroconductive film on an article by coating or the like methods and removal of the film from the article are easy, and a large electrification-suppressing effect can stably be obtained, and a method for suppressing electrification in observation, inspection or measurement comprising irradiating charged particle beams onto an article and detection of the reflected charged particle beams or secondary radiation.

EXAMPLE

The present invention will now be illustrated-in greater detail by way of Examples, but it should be understood that the present invention should not be limited thereto.

The water-soluble electroconductive polymers used in Examples are shown below.

Polymer (1):

A copolymer comprising a structural unit represented by formula (I-1):

(corresponding to formula (Ia) or (Ib) wherein $R_1$ and $R_2$ are each a hydrogen atom) and an isothianaphthenylene unit.

Polymer (2):

A copolymer comprising a structural unit represented by formula (II-1):

(corresponding to formula (IIa) or (IIb) wherein $R_3$ and $R_4$ are each a hydrogen atom, and M is $NH_4^+$) and an isothianaphthenylene unit.

Polymer (3):

A copolymer comprising a structural unit represented by formula (II-2):

(corresponding to formula (IIa) or (IIb) wherein one of $R_3$ and $R_4$ is a decyloxy group with the other being a hydrogen atom, and M is $NH(CH_3)_3^+$) and a 5-decyloxyisothianaphthenylene unit.

Polymer (4):

A homopolymer comprising a structural unit of formula (I-1).

Polymer (5):

A copolymer comprising a structural unit of formula (I-1) and a structural unit of formula (II-1).

Polymer (6):

A copolymer comprising a structural unit of formula (I-2):

(corresponding to formula (Ia) or (Ib) wherein $R_1$ and $R_2$ are connected to each other to form a dioxymethylene group) and a 5,6-dioxymethyleneisothianaphthenylene unit.

The water-soluble electroconductive polymers used in Comparative Examples are shown below.

Compound A:

Compound B:

wherein n is an integer showing the degree of polymerization.

Comparative compounds A and B were prepared in accordance with the method disclosed in JP-A-4-32848 and JP-A-4-349614, respectively.

SYNTHESIS EXAMPLE 1

Synthesis of Polymer (1)

Figure 1:
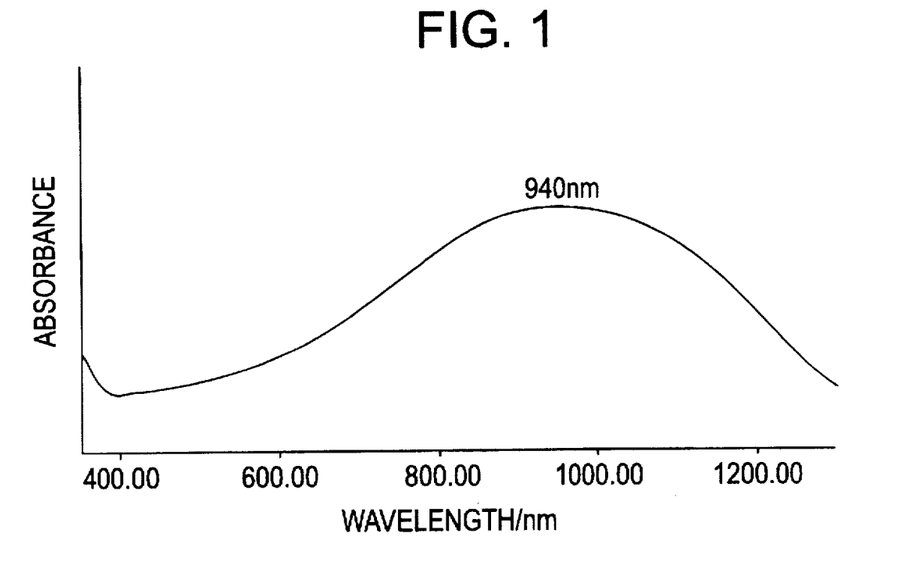
FIG. 1 is the visible to near infrared absorption spectrum of a dialyzed aqueous solution of the copolymer (containing a structural unit represented by formula (IIa) or (IIb), wherein $R_3$ and $R_4$ each is a hydrogen atom, and M is $Na^+$, and an isothianaphthenylene unit) synthesized in Synthesis Example 1.
Figure 2:
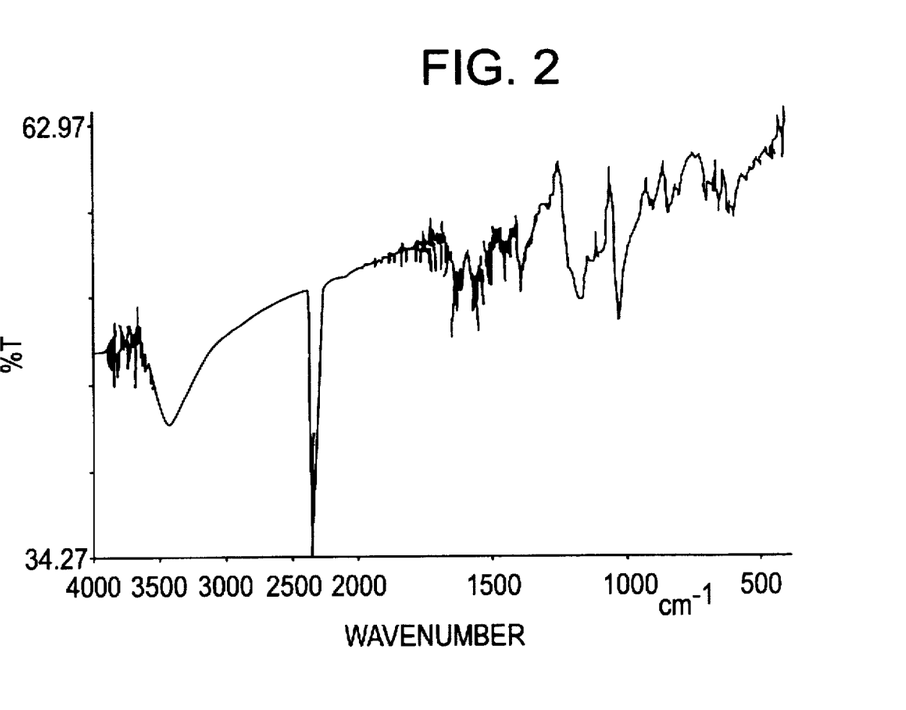
FIG. 2 is the infrared absorption spectrum of the dried copolymer (containing a structural unit represented by formula (IIa) or (IIb), wherein $R_3$ and $R_4$ each is a hydrogen atom, and M is $Na^+$, and an isothianaphthenylene unit) synthesized in Synthesis Example 1.

825 mg of 1,3-dihydroisothianaphthene was slowly added to 1.5 g of fuming sulfuric acid (2.0% $SO_3$) kept at 10° C. while stirring. The mixture was allowed to warm to room temperature while stirring for 1 hour, whereupon the reaction mixture assumed a reddish purple color. On heating to 70° C., the reaction mixture turned to deep blue and, 30 minutes later solidified. The reaction mixture was placed into 100 ml of a 0.1N sodium hydroxide solution in methanol with stirring, and the precipitated polymer was collected by centrifugation. The resulting polymer was dissolved in 100 ml of water, and the solution was dialyzed to remove sodium sulfate. Water was distilled away from the dialyzate (aqueous solution), and the residue was dried in vacuo to obtain 430 mg of a deep blue copolymer comprising a structural unit of formula (IIa) or (IIb) wherein $R_3$ and $R_4$ are each a hydrogen atom, and M is $Na^+$ and an isothianaphthenylene unit. The visible to near infrared absorption spectrum of an aqueous solution containing the resulting copolymer is shown in FIG. 1, and the infrared absorption spectrum of the copolymer, dialyzed and dried, is shown in FIG. 2.

Figure 3:
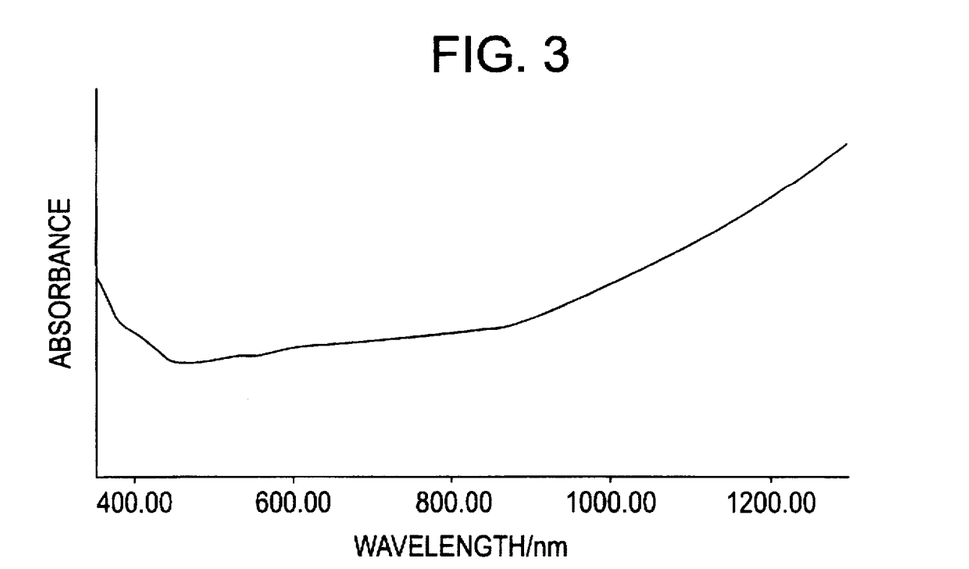
FIG. 3 is the visible to near infrared absorption spectrum of an aqueous solution of copolymer (1) (containing a structural unit represented by formula (Ia) or (Ib), wherein $R_1$ and $R_2$ each is a hydrogen atom, and an isothianaphthenylene unit) synthesized in Synthesis Example 1.

In 100 ml of water was dissolved 200 mg of the copolymer prepared above, and the solution was subjected to an ion-exchange treatment with an acid type ion-exchange resin, Amberlite IR-120B, to obtain an aqueous solution of copolymer (1). The visible to near infrared absorption spectrum of the aqueous solution is shown in FIG. 3.

The sulfo group in copolymer (1) was quantitatively determined by neutralization titration to calculate the content of the unit of formula (I-1). As a result, the content of the unit (I-1) was found to be 84 mol % (0.84 in terms of a molar fraction). The weight-average molecular weight of copolymer (1) was found to be 15,000 by GPC. Water was evaporated from the aqueous solution, and the electrical conductivity of the black residue, copolymer (1), was measured using a four-probe method. As a result, the conductivity was found to be 1 S/cm.

SYNTHESIS EXAMPLE 2

Synthesis of Polymer (2)

Figure 4:
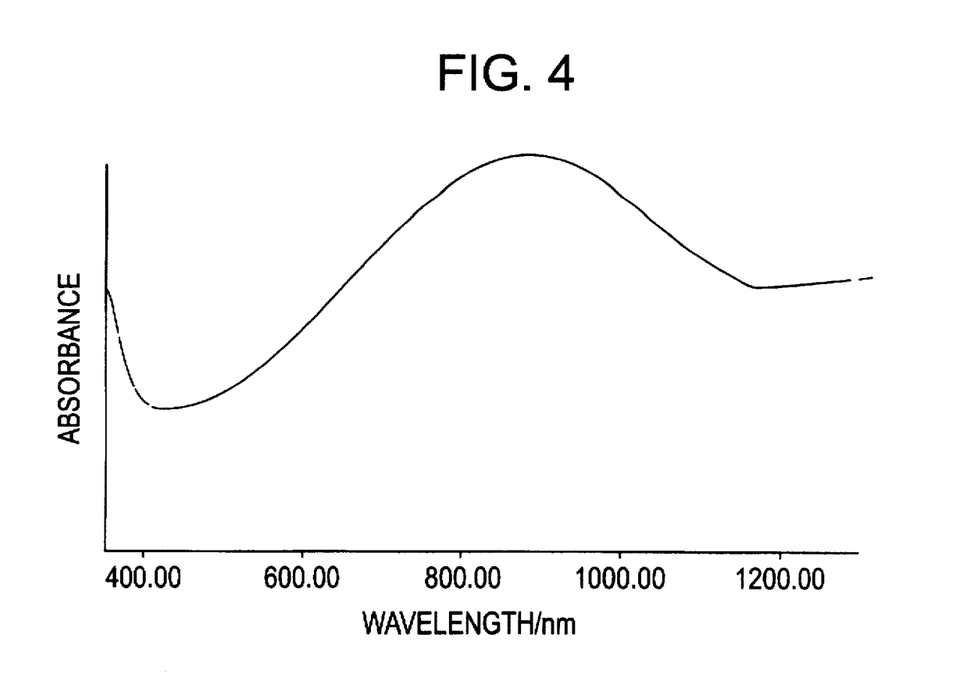
FIG. 4 is the visible to near infrared absorption spectrum of an aqueous solution of copolymer (2) (containing a structural unit represented by formula (IIa) or (IIb), wherein $R_3$ and $R_4$ each is a hydrogen atom, and M is $NH_4^+$, and isothianaphthenylene unit) synthesized in Synthesis Example 2.

In 10 ml of water was dissolved 100 mg of the black copolymer (1) prepared in Synthesis Example 1, and 4 ml of 1N aqueous ammonium hydroxide solution to adjust to pH 9.4. By this pH adjustment, the $H^+$ ion of the sulfo group in the copolymer was easily converted to an $NH_4^+$ ion, that is, the structural unit of formula (I-1) was converted to a structural unit of formula (II-1), to obtain an aqueous solution of copolymer (2). The visible to near infrared absorption spectrum of the resulting aqueous solution is shown in FIG. 4.

SYNTHESIS EXAMPLE 3

Synthesis of Polymer (3)

500 mg of poly(5-decyloxy-1,3-dihydroisothianaphthenylene) was slowly added to 4 ml of fuming sulfuric acid (20% $SO_3$) while stirring. On heating to 80° C., the reaction mixture turned to deep blue. In about 500 ml of water was dissolved 200 mg of the reaction mixture, and the aqueous solution was adjusted to pH 1.9 with hydrochloric acid. The mixture was purified by ultrafiltration, followed by concentration. The concentrate was distilled to remove the solvent, and the residue was dried in vacuo to obtain 150 mg of a black copolymer comprising a structural unit of formula (Ia) or (Ib) wherein one of $R_1$ and $R_2$ is a decyloxy group, and the other is a hydrogen atom and a 5-decyloxyisothianaphthenylene unit. The visible to near infrared absorption spectrum of an aqueous solution of the resulting copolymer was the same as FIG. 3.

The sulfo group in the resulting copolymer was quantitatively determined by neutralization titration. As a result, the content of the unit of formula (II-2) in the copolymer was found to be 51 mol %. The weight-average molecular weight of the copolymer as measured by GPC was 8,000.

An aqueous solution of the resulting copolymer was neutralized to pH 9.5 with trimethylamine to obtain an aqueous solution of polymer (3). The visible to near infrared absorption spectrum of the aqueous solution was the same as FIG. 4.

SYNTHESIS EXAMPLE 4

Synthesis of Polymer (4)

To 4 ml of fuming sulfuric acid (20% $SO_3$) kept at 20° C. or lower was slowly added 1.0 g of 1,3-dihydroisothianaphthene while stirring. The mixture was allowed to warm to room temperature, followed by stirring for 4 hours, whereupon the reaction mixture assumed a brown color. The reaction mixture was dissolved in 150 ml of ice-water, and 20 g of sodium chloride was added thereto. The system was heated to uniformly dissolve the sodium chloride, followed by slowly salting out. The precipitate was separated by centrifugation. After removing the supernatant liquor, the resulting solid was dried in vacuo and purified to obtain 350 mg of sodium 1,3-dihydro-5-isothianaphthenesulfonate as white powder.

Two grams of sodium 1,3-dihydro-5-isothianaphthenesulfonate prepared in the same manner as described above were mixed with 10 g of ferric chloride, and 4 g of water was added thereto, followed by stirring. After stirring for 1 hour, the resulting black reaction mixture was thoroughly washed with 200 ml of water and then with 200 ml of acetone and dried to obtain 0.9 g of black powder. The powder was dissolved in 50 ml of a 0.1N aqueous sodium hydroxide solution with stirring. After removing any insoluble matter, the aqueous solution was subjected to an ion-exchange treatment with an acidic ion-exchange resin to obtain an aqueous solution of polymer (4). The visible to near infrared absorption spectrum of an aqueous solution containing the polymer (4) was the same as FIG. 3. Polymer (4) was found to comprise 100 mol % of the structural unit of formula (I-1), to have a weight-average molecular weight of 12,000, and an electrical conductivity of 2 S/cm as measured in the same manner as described in Synthesis Example 1.

SYNTHESIS EXAMPLE 5

Synthesis of Polymer (5)

An aqueous solution containing polymer (4) prepared in Synthesis Example 4 was adjusted to pH 5 by addition of a 1N aqueous ammonium hydroxide aqueous solution, whereby part of the $H^+$ ion of the sulfo group was converted to an $NH_4^+$ ion. There was thus obtained an aqueous solution of polymer (5).

SYNTHESIS EXAMPLE 6

Synthesis of Polymer (6)

1,3-Dihydro-5,6-dioxymethyleneisothianaphthene was prepared in accordance with the method described in *Synthetic Metals*, Vol. 40, pp. 1–12 (1990). The product was sulfonated with fuming sulfuric acid (20% $SO_3$) and purified in the same manner as in Synthesis Example 1 to obtain an aqueous solution containing polymer (6). Polymer (6) was found to comprise 80 mol % of the structural unit of formula (I-2) and to have a weight-average molecular weight of 9,000 and an electrical conductivity of 0.5 S/cm as measured in the same manner as in Synthesis Example 1.

EXAMPLE 1

Figure 5:
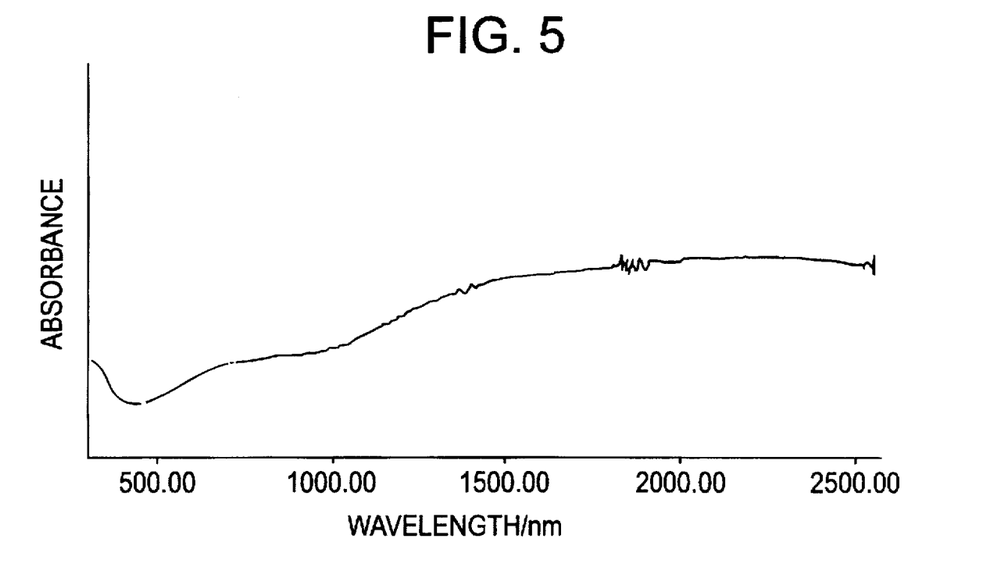
FIG. 5 is the visible to near infrared absorption spectrum of the electroconductive film prepared in Example 1.

An aqueous solution (pH 1.7) containing polymer (1) was prepared. The aqueous polymer solution was applied to a glass substrate by spin-coating at 1,500 rpm to form an electroconductive film having a thickness of 0.02 μm. The electroconductive film had a surface resistivity of $1\times10^6 \Omega$ per square as measured with "Megaresta", manufactured by Shishido Seidenkisha. The visible to near infrared absorption spectrum of the film is shown in FIG. 5.

The antistatic composition consisting of the same aqueous solution of polymer (1) was applied to a positive electron beam-sensitive resist comprising a novolak and diazonaphthoquinone by spin-coating. The resist was exposed to an electron beam and developed to form a resist pattern according to the method described in *J. Vac. Sci. Technol.*, B7(6), p. 1519 (November/December, 1989). The electroconductive film on the resist could be removed simultaneously with the development.

The positional deviation of the resulting pattern from the original was within 0.05 μm, indicating that the resist underwent no adverse influence of electrification. To the contrary, the positional deviation observed in the case of using no electroconductive film was 2 μm or more.

EXAMPLE 2

The electroconductive film formed on a glass substrate in Example 1 was heat treated at 120° C., and the surface resistivity and absorption spectrum were measured. The film had a surface resistivity of $3 \times 10^6 \Omega$ per square. The visible to near infrared absorption spectrum was the same as FIG. 5.

The same resist with an electroconductive film as prepared in Example 1 was exposed to an electron beam in the same manner as in Example 1, except that the electroconductive film was heat treated at 120° C. prior to the exposure. The positional deviation of the resulting resist pattern was within 0.05 μm, indicating equality of the electrification-suppressing effect of the electroconductive film to that obtained in the case where no heat treatment was conducted.

When the electroconductive film formed on a glass substrate using the antistatic composition consisting of the aqueous solution of polymer (1) prepared in Example 1 was allowed to stand in air for 10 days, the surface resistivity was $5 \times 10^6 \Omega$ per square, and the visible to near infrared absorption spectrum was the same as FIG. 5. When the electroconductive film formed on the same resist as in Example 1 was allowed to stand in air for 10 days and then exposed to an electron beam, no positional deviation in pattern formation was observed, indicating unchangeability of the electrification-suppressing effect of the electroconductive film on standing in air.

When the electroconductive film formed on the resist was stored under a nitrogen atmosphere for 10 days, although there was observed a slight reduction in surface resistivity to $5 \times 10^7 \Omega$ per square, no positional deviation occurred at all in the pattern formation with an electron beam, showing that the electrification-suppressing effect of the electroconductive film did not change on the storage for 10 days.

EXAMPLE 3

Figure 6:
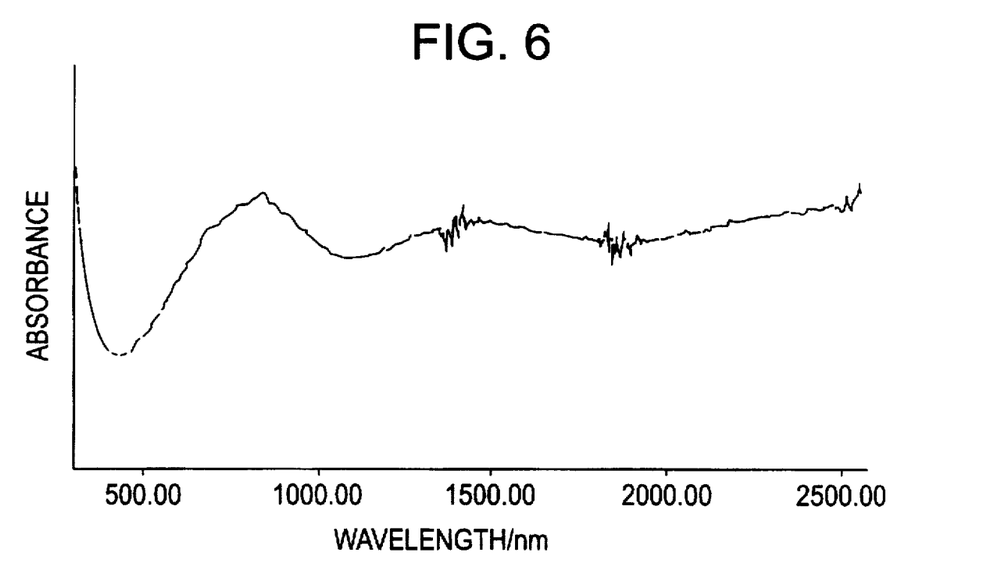
FIG. 6 is the visible to near infrared absorption spectrum of the electroconductive film prepared and subjected to a heat treatment in Example 2.

An antistatic composition consisting of an aqueous solution (pH 9.4) containing polymer (2) was prepared. The composition was applied to a glass substrate by spin-coating at 1500 rpm to form an electroconductive film having a thickness of 0.02 μm. When the resulting electroconductive film was heat treated at 120° C., the surface resistivity was $1 \times 10^7 \Omega$ per square. The visible to near infrared absorption spectrum of the heat-treated film is shown in FIG. 6.

The same aqueous solution of polymer (2) was applied to a chemically amplified negative electron beam-sensitive resist comprising a novolak, a photosensitive compound, and an acid generator having a bromomethyl group (SAL 601) in the same manner as in Example 1. The resist was heat treated at 120° C. and then exposed to an electron beam and developed in the same manner as in Example 1. The positional deviation of the resulting resist pattern from the original was within 0.05 μm, indicating unchangeability of the electrification-suppressing effect of the electroconductive film against the heat treatment. Baking of the resist pattern was conducted before removal of the electroconductive film. The electroconductive film could be completely removed by washing with water or could be removed with a developing solution at the time of development.

The above-prepared antistatic composition consisting of an aqueous solution of polymer (2) was allowed to stand for 1 year and tested in the same manner as described above. As a result, the electrification-suppressing effect of the electroconductive film prepared therefrom was the same as that obtained with the solution immediately after preparation Further, the test was conducted in the same manner as above, except for using an aqueous solution of a polymer prepared in the same manner as for polymer (2) except that the aqueous solution of polymer (1) was adjusted to a pH varying between 1.7 and 9.4 by addition of a varied amount of an 1N aqueous ammonium hydroxide solution. The electrification-suppressing effect obtained from these solutions was entirely the same as observed in the above test. For example, when an electroconductive film obtained by using an antistatic composition adjusted to pH 7.6 was subjected to a heat treatment at 120° C., the surface resistivity was $6 \times 10^6 \Omega$ per square, which is substantially equal to that obtained where no heat treatment was conducted.

EXAMPLE 4

An antistatic composition comprising polymer (3) was applied to a polyethylene film by dip-coating to form an electroconductive film. When the electroconductive film was observed under a scanning electron microscope (SEM), a satisfactory image was obtained at a magnification of 25,000 under an accelerating voltage of 6 kV, indicating no interference by electrification.

EXAMPLE 5

An electroconductive film was formed in the same manner as in Example 1, except for using an antistatic composition consisting of an aqueous solution (pH 1.7) of polymer (4) as an antistatic agent. The electroconductive film had a surface resistivity of $5 \times 10^5 \Omega$ per square. When applied on the same resist as used in Example 1, the antistatic agent produced the same electrification-suppressing effect as obtained in Example 1, as proved by the positional deviation of the resist pattern.

EXAMPLE 6

An electroconductive film was formed in the same manner as in Example 3, except for using an antistatic composition consisting of an aqueous solution (pH 5.0) of polymer (5) as an antistatic agent. The electroconductive film had a surface resistivity of $1 \times 10^6 \Omega$ per square. When applied on the same resist as used in Example 3, the antistatic agent produced the same electrification-suppressing effect as obtained in Example 3, as proved by the positional deviation of the resist pattern.

EXAMPLE 7

An electroconductive film was formed in the same manner as in Example 1, except for using an antistatic composition consisting of an aqueous solution (pH 1.7) of polymer (6) as an antistatic agent. The resulting electroconductive film had a surface resistivity of $2 \times 10^6 \Omega$ per square. When applied on the same resist as used in Example 1, the antistatic agent produced the same electrification-suppressing effect as obtained in Example 1, as proved by the positional deviation of the resist pattern.

When the electroconductive film was allowed to stand in air for 10 days, the surface resistivity was $3 \times 10^6 \Omega$ per square, proving substantially unchanged. The electrification-sappressing effect was also unchanged.

COMPARATIVE EXAMPLE 1

The same test as in Example 2 was carried out, except for using comparative Compound A of formula (III) as a water-soluble electroconductive polymer. The resulting electroconductive film had a surface resistivity of $5\times10^6\Omega$ per square when measured immediately after formation, but increased to $3\times10^8\Omega$ per square upon being heat treated at 120° C. The electrification-suppressing effect of the heat-treated electroconductive film on a resist was evaluated in the same manner as in Example 1. As a result, the positional deviation was 2 μm or greater, showing that no electrification-suppressing effect was exerted in electron beam irradiation.

Where an electroconductive film was formed by using a solution of compound A adjusted to pH 9.3 with a 1N aqueous ammonium hydroxide solution, the surface resistivity of the film was $6\times10^8\Omega$ per square, and no electrification-suppressing effect was exerted in electron beam irradiation.

COMPARATIVE EXAMPLE 2

The same test as in Example 3 was carried out, except for using comparative Compound B of formula (IV) as a water-soluble electroconductive polymer. The resulting electroconductive film had a surface resistivity of $2\times10^7\Omega$ per square when measured immediately after formation. However, the film had poor removability and could not be completely removed by washing with water. When the film was allowed to stand in the air for 10 days, the surface resistivity increased to $4\times10^8\Omega$ per square, and an electrification-suppressing effect was no more exerted in electron beam irradiation.

An electroconductive film was formed by using an aqueous solution of compound B after having been allowed to stand at ambient temperature for 2 months. The film had a surface resistivity of $1\times10^9\Omega$ per square, and no electrification-suppressing effect was produced any more.

COMPARATIVE EXAMPLE 3

The same test as in Example 4 was carried out, except for using comparative Compound B as a water-soluble electroconductive polymer. When observed under an SEM at a magnification of 25,000 and an accelerating voltage of 6 kV, the electroconductive film on the substrate only gave an overall white image (failure of observation). On decreasing the magnification to 8,000, the area which had been in the sight at a magnification of 25,000 looked white due to the influence of electrification. It seems that the conductivity of the electroconductive film was lost due to irradiation with a high-intensity electron beam.

Potential Utilities in Industry

As described and demonstrated above, the antistatic agent and the antistatic composition according to the present invention produce excellent electrification-suppressing effect and serve for suppressing electrification of an article, such as an electronic element, an electronic component, electronic equipment, an electrical part, electrical equipment, an instrumental equipment, and parts thereof, during the production or use of the article. Trouble-making electrification of these articles can effectively be suppressed by using the antistatic agent and the antistatic composition of the present invention or by the method for suppressing electrification of the present invention.

For example, where production or use of an article includes a step of irradiation with charged particle -beams, the present invention makes it possible to eliminate various problems due to accumulation of charges, such as positional deviation in pattern formation, distortion of an image under observation, and deterioration in precision.

According to the present invention, the antistatic agent can be formulated into an aqueous solution or an antistatic composition having its pH adjusted to an optimum value according to the properties of an article of which electrification is suppressed. Therefore, electrification of a wide variety of articles can be suppressed by forming an electroconductive film on the article using such an aqueous solution or an antistatic composition. Additionally, the antistatic agent or antistatic composition of the present invention can be preserved for a long period of time even in the form of an aqueous solution.

Where formation of an electroconductive film on an article is conducted by coating, dipping, spraying or the like technique, restrictions on film formation are lightened as compared with the conventional techniques. Even if the electroconductive film is subjected to a heat treatment or left to stand for a long period of time, it retains the electrification-suppressing effect and removability, offering much advantage for practical use.

The electrification of the article having an electroconductive film comprising the antistatic agent of the present invention are substantially suppressed and the article retains the electrification-suppressing effect even when subjected to a heat treatment at a high temperature or stored for a long period of time. Even where the electroconductive film of the article is exposed to high energy electron beams for pattern formation, subjected to a heat treatment at a high temperature, or left to stand in the air for a long period of time, it retains water-solubility and can easily be removed by, for example, washing with water.

According to the method for observing or inspecting an article of the present invention, in which an electroconductive film comprising the antistatic agent of the present invention is formed on an article to be observed or inspected prior to observation or inspection under irradiation with charged particle beams, unfavorable electrification phenomena due to accumulation of charges which might occur during irradiation, such as positional deviation, distortion of an image under observation, and deterioration in precision, can be eliminated.

I claim:

1. A method for suppressing electrification of an article during the production or use of the article, said method comprising forming an electroconductive film on the article, said electroconductive film comprising a water-soluble electroconductive polymer comprising at least one repeating unit selected from a structural unit represented by formula (Ia) and a structural unit represented by formula (IIa), and having π-electron conjugated double bonds in the main chain of said polymer:

-continued (IIa)

wherein $R_1$, $R_2$, $R_3$, and $R_4$ each independently represents a hydrogen atom or a monovalent group selected from the group consisting of a linear or branched, saturated or unsaturated alkyl, alkoxy or alkyl ester group each having from 1 to 20 carbon atoms, $SO_3^-M$ in which M represents $H^+$ for $R^1$ or $R^2$, a halogen atom, a nitro group, a cyano group, a primary, secondary or tertiary amino group, a trihalomethyl group, and a substituted or unsubstituted phenyl group; M represents a quaternary ammonium cation represented by $NR_5R_6R_7R_8^+$, a quaternary cation of a Group Vb element represented by $PR_5R_6R_7R_8^+$ or $AsR_5R_6R_7R_8^+$, or an alkali metal ion, wherein $R_5$, $R_6$, $R_7$, and $R_8$ each independently represents a hydrogen atom, a linear or branched, substituted or unsubstituted alkyl group having from 1 to 30 carbon atoms or a substituted or unsubstituted aryl group having from 6 to 30 carbon atoms, in which said alkyl or aryl group may contain a group containing an element other than carbon and hydrogen; $R_1$ and $R_2$, $R_3$ and $R_4$, or two or more of $R_5$, $R_6$, $R_7$, and $R_8$ may be connected together at any optional position to form at least one divalent chain which forms, together with two carbon atoms of the substituted ring or a substituted atom of the Group Vb element, at least one saturated or unsaturated ring structure; the alkyl group represented by $R_1$, $R_2$, $R_3$, $R_4$, $R_5$, $R_6$, $R_7$ or $R_8$ or the alkoxy or alkyl ester group represented by $R_1$, $R_2$, $R_3$ or $R_4$ may contain in the chain thereof at least one bond selected from the group consisting of a carbonyl group, an ether group, an amido group, a sulfide group, a sulfinyl group, a sulfonyl group, and an imino group, wherein said production or use of the article includes a step of irradiating charged particle beams onto the article.

2. A method as claimed in claim 1, wherein said water-soluble electroconductive polymer has a molecular weight of 2,000 or more.

3. A method for suppressing electrification of an article during the production or use of the article, said method comprising forming an electroconductive film on the article, said electroconductive film comprising a water-soluble electroconductive polymer comprising at least one repeating unit selected from a structural unit represented by formula (Ib) and a structural unit represented by formula (IIb), and having π-electron conjugated double bonds in the main chain of said polymer:

(Ib)

-continued (IIb)

wherein $R_1$, $R_2$, $R_3$ and $R_4$ each independently represents a hydrogen atom or a monovalent group selected from the group consisting of a linear or branched, saturated or unsaturated alkyl or alkoxy group each having from 1 to 20 carbon atoms, a halogen atom, a nitro group, a cyano group, a primary, secondary or tertiary amino group, a trihalomethyl group, and a substituted or unsubstituted phenyl group; M represents a quaternary ammonium cation represented by $NR_5R_6R_7R_8^+$, a quaternary cation of a Group Vb element represented by $PR_5R_6R_7R_8^+$ or $AsR_5R_6R_7R_8^+$, or an alkali metal ion, wherein $R_5$, $R_6$, $R_7$, and $R_8$ each independently represents a hydrogen atom, a linear or branched alkyl group having from 1 to 6 carbon atoms or a substituted or unsubstituted aryl group; $R_1$ and $R_2$, $R_3$ and $R_4$, or two or more of $R_5$, $R_6$, $R_7$, and $R_8$ in M may be connected together at any optional position to form at least one divalent chain which forms, together with two carbon atoms of the substituted ring or a substituted atom of the Group Vb element, at least one saturated or unsaturated hydrocarbon ring or heterocyclic structure; the alkyl group represented by $R_1$, $R_2$, $R_3$, $R_4$, $R_5$, $R_6$, $R_7$ or $R_8$ or the alkoxy group represented by $R_1$, $R_2$, $R_3$ or $R_4$ may contain in the chain thereof at least one bond selected from the group consisting of a carbonyl group, an ether group, and an amido group, wherein said production or use of the article includes a step of irradiating charged particle beams onto the article.

4. A method as claimed in claim 3, wherein said water-soluble electroconductive polymer has a molecular weight of 2,000 or more.

5. A method for observing or inspecting an article with substantially suppressing electrification thereof, said method comprising the steps of:

forming an electroconductive film on the article;

irradiating charged particle beams onto said article; and detecting the reflected charged particle beams or secondary radiation, said electroconductive film comprising a water-soluble electroconductive polymer comprising at least one repeating unit selected from a structural unit represented by formula (Ia) and a structural unit represented by formula (IIa), and having π-electron conjugated double bonds in the main chain of said polymer:

(Ia)

(IIa)

wherein $R_1$, $R_2$, $R_3$, and $R_4$ each independently represents a hydrogen atom or a monovalent group selected from the group consisting of a linear or branched, saturated or unsaturated alkyl, alkoxy or alkyl ester group each having from 1 to 20 carbon atoms, a halogen atom, $SO_3^-M$ in which M represents $H^+$ for $R^1$ or $R^2$, a nitro group, a cyano group, a primary, secondary or tertiary amino group, a trihalomethyl group, and a substituted or unsubstituted phenyl group; M represents a quaternary ammonium cation represented by $NR_5R_6R_7R_8^+$, a quaternary cation of a Group Vb element represented by $PR_5R_6R_7R_8^+$ or $AsR_5R_6R_7R_8^+$, or an alkali metal ion, wherein $R_5$, $R_6$, $R_7$, and $R_8$ each independently represents a hydrogen atom, a linear or branched, substituted or unsubstituted alkyl group having from 1 to 30 carbon atoms or a substituted or unsubstituted aryl group having from 6 to 30 carbon atoms, in which said alkyl or aryl group may contain a group containing an element other than carbon and hydrogen; $R_1$ and $R_2$, $R_3$ and $R_4$, or two or more of $R_5$, $R_6$, $R_7$, and $R_8$ may be connected together at any optional position to form at least one divalent chain which forms, together with two carbon atoms of the substituted ring or a substituted atom of the Group Vb element, at least one saturated or unsaturated ring structure; the alkyl group represented by $R_1$, $R_2$, $R_3$, $R_4$, $R_5$, $R_6$, $R_7$ or $R_8$ or the alkoxy or alkyl ester group represented by $R_1$, $R_2$, $R_3$ or $R_4$ may contain in the chain thereof at least one bond selected from the group consisting of a carbonyl group, an ether group, an ester group, an amido group, a sulfide group, a sulfinyl group, a sulfonyl group, and an imino group.

6. A method as claimed in claim 5, wherein said water-soluble electroconductive polymer has a molecular weight of 2,000 or more.

7. A method for observing or inspecting an article with substantially suppressing electrification thereof, said method comprising the steps of:
   forming an electroconductive film on said article;
   irradiating charged particle beams onto said article; and
   detecting the reflected charged particle beams or secondary radiation,
   said electroconductive film comprising a water-soluble electroconductive polymer comprising at least one repeating unit selected from a structural unit represented by formula (Ib) and a structural unit represented by formula (IIb), and having π-electron conjugated double bonds in the main chain of said polymer:

(Ib)

(IIb)

wherein $R_1$, $R_2$, $R_3$, and $R_4$ each independently represents a hydrogen atom or a monovalent group selected from the group consisting of a linear or branched, saturated or unsaturated alkyl or alkoxy group each having from 1 to 20 carbon atoms, a halogen atom, a nitro group, a cyano group, a primary, secondary or tertiary amino group, a trihalomethyl group, and a substituted or unsubstituted phenyl group; M represents a quaternary ammonium cation represented by $NR_5R_6R_7R_8^+$, a quaternary cation of a Group Vb element represented by $PR_5R_6R_7R_8^+$ or $AsR_5R_6R_7R_8^+$, or an alkali metal ion, wherein $R_5$, $R_6$, $R_7$, and $R_8$ each independently represents a hydrogen atom, a linear or branched alkyl group having from 1 to 6 carbon atoms or a substituted or unsubstituted aryl group; $R_1$ and $R_2$, $R_3$ and $R_4$, or two or more of $R_5$, $R_6$, $R_7$, and $R_8$ in M may be connected together at any optional position to form at least one divalent chain which forms, together with two carbon atoms of the substituted ring or a substituted atoms of the Group Vb element, at least one saturated or unsaturated hydrocarbon ring or heterocyclic structure; the alkyl group represented by $R_1$, $R_2$, $R_3$, $R_4$, $R_5$, $R_6$, $R_7$ or $R_8$ or the alkoxy group represented by $R_1$, $R_2$, $R_3$ or $R_4$ may contain in the chain thereof at least one bond selected from the group consisting of a carbonyl group, an ether group, and an amido group.

8. A method as claimed in claim 7, wherein said water-soluble electroconductive polymer has a molecular weight of 2,000 or more.

* * * * *